(12) United States Patent
Chojnacki et al.

(10) Patent No.: US 7,036,372 B2
(45) Date of Patent: May 2, 2006

(54) Z-AXIS ANGULAR RATE SENSOR

(75) Inventors: Eric P. Chojnacki, Dryden, NY (US);
June P. Shen-Epstein, Freeville, NY (US); Nenad Nenadic, Ithaca, NY (US); Nathan L. Stirling, Dryden, NY (US); Vasile Nistor, Los Angeles, CA (US)

(73) Assignee: Kionix, Inc., Ithaca, NY (US)

( * ) Notice: Subject to any disclaimer, the term of this patent is extended or adjusted under 35 U.S.C. 154(b) by 136 days.

(21) Appl. No.: 10/847,750

(22) Filed: May 18, 2004

(65) Prior Publication Data
US 2005/0072231 A1    Apr. 7, 2005

Related U.S. Application Data

(60) Provisional application No. 60/505,990, filed on Sep. 25, 2003.

(51) Int. Cl.
*G01P 9/04* (2006.01)

(52) U.S. Cl. .................. 73/504.12; 73/504.14
(58) Field of Classification Search ............. 73/504.12, 73/504.14, 504.16
See application file for complete search history.

(56) References Cited

U.S. PATENT DOCUMENTS

| | | | |
|---|---|---|---|
| 2,309,853 A | 2/1943 | Lyman et al. .................. 33/204 |
| 5,349,855 A | 9/1994 | Bernstein et al. ............. 73/505 |
| 5,426,070 A | 6/1995 | Shaw et al. .................. 437/203 |
| 5,604,312 A | 2/1997 | Lutz ............................. 73/504 |
| 5,728,936 A * | 3/1998 | Lutz ........................ 73/504.12 |
| 5,889,207 A | 3/1999 | Lutz ........................ 73/504.13 |
| 5,895,850 A | 4/1999 | Buestgens ................ 73/504.12 |
| 5,911,156 A | 6/1999 | Ward et al. ............. 73/504.16 |
| 5,992,233 A | 11/1999 | Clark ....................... 73/514.35 |
| 6,067,858 A | 5/2000 | Clark et al. ............. 73/504.16 |
| 6,079,271 A * | 6/2000 | Hulsing, II .............. 73/504.12 |
| 6,117,701 A | 9/2000 | Buchan et al. ................. 438/52 |
| 6,239,473 B1 | 5/2001 | Adams et al. ................ 257/419 |
| 6,342,430 B1 | 1/2002 | Adams et al. ............. 438/424 |
| 6,494,094 B1 | 12/2002 | Tsugai et al. ............ 73/504.12 |
| 6,658,937 B1 | 12/2003 | Ao et al. .................. 73/504.14 |

OTHER PUBLICATIONS

*Gyrodynamics* by R.N. Arnold and L.M. Maunder, Academic Press, §13.7, p. 369 (1961).
*Classical Dynamics of Particles and Systems* by J.B Marion and S.T. Thornton, Harcourt College Publishers, 4th ed., §12.2, p. 460 (1995).

* cited by examiner

*Primary Examiner*—John E. Chapman
(74) *Attorney, Agent, or Firm*—Jones, Tullar & Cooper, PC (57) ABSTRACT

An oscillatory rate sensor is described for sensing rotation about the "z-axis". It is tuning-fork in nature with structural linkages and dynamics such that fundamental anti-phase oscillation of two proof masses is accomplished by virtue of the mechanical linkages.

10 Claims, 6 Drawing Sheets

Z-AXIS ANGULAR RATE SENSOR

REFERENCE TO RELATED APPLICATIONS

This application claims an invention which was disclosed in Provisional Application No. 60/505,990, filed Sep. 25, 2003, entitled "Z-AXIS ANGULAR RATE SENSOR WITH UNIQUE DYNAMICS". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of microdevices and microstructures. More particularly, the invention pertains to angular rate sensors.

2. Description of Related Art

There is considerable interest in the development of low-cost, reliable, high-quality gyroscopic rate-of-rotation sensors enabled by developments in Micro Electro-Mechanical Systems (MEMS) technology. Traditional military-grade gyroscope fabrication techniques are not scalable to high-volume, low-cost manufacturing. MEMS technology utilizes semiconductor fabrication techniques to construct microscopic electromechanical systems, and hence provides the manufacturing model for low-cost inertial sensing systems. A variety of researchers have pursued MEMS oscillatory rate gyroscope designs using a multiplicity of design and fabrication methods. All such designs, nevertheless, stem from fundamental oscillatory gyrodynamic principles, embodied early in U.S. Pat. No. 2,309,853 (Lyman et al.) and discussed in texts such as *Gyrodynamics* by R. N. Arnold and L. M. Maunder, Academic Press, §13.7, p. 369 (1961).

Rate sensors indicate rate of rotation about a stipulated Cartesian axis that is typically parallel to an axis of the sensor package. The terminology "z-axis" refers to sensing along an axis normal to the package mounting plane, such as a printed circuit board, also referred to as a "yaw" rate sensor. This "z-axis" is also typically normal to the plane of the silicon wafer in which a MEMS sensor is fabricated.

Classical coupled oscillators have "symmetric" and "anti-symmetric" resonant modes with the symmetric mode, undesired for certain applications, discussed in texts such as *Classical Dynamics of Particles and Systems* by J. B. Marion and S. T. Thornton, Harcourt College Publishers, 4$^{th}$ ed., §12.2, p. 460 (1995), being fundamental.

In its simplest form, an oscillatory rate gyroscope first drives a spring-mass system at its resonant frequency along a linear axis. For a drive force given by:

$$F_x(t) = F_{drive} \sin(\omega_x t), \qquad (1)$$

the position and velocity of the mass are described by:

$$x_{res}(t) = -\delta_x \cos(\omega_x t) \text{ and} \qquad (2)$$

$$\dot{x}_{res}(t) = v_x(t) = \delta_x \omega_x \sin(\omega_x t), \text{ where} \qquad (3)$$

$$\delta_x = \frac{Q_x F_{drive}}{k_x} \text{ and} \qquad (4)$$

$$\omega_x = \sqrt{k_x/m}. \qquad (5)$$

$\delta_x$ is the resonant displacement amplitude along the x-axis, $\omega_x$ is the resonant frequency along the x-axis, $Q_x$ is the resonator quality factor along the x-axis, $k_x$ is the linear spring constant along the x-axis, and m is the mass. When this oscillator is rotated about some axis with a rate $\vec{\Omega}$, the Coriolis force as viewed in the rotating coordinate system is given by:

$$\vec{F}_{Coriolis} = -2m\vec{\Omega} \times \vec{v}, \qquad (6)$$

which for $\vec{\Omega} = \Omega_z$ and $\vec{v}$ given by eq. (3) becomes:

$$\vec{F}_{Coriolis} = F_y(t) = -2m\Omega_z \delta_x \omega_x \sin(\omega_x t). \qquad (7)$$

This Coriolis force then superimposes a y-motion upon the x-motion of the oscillating mass, or a suspended mass contained therein. The y-reaction motion is not necessarily at resonance, and its position is described by:

$$y(t) = A(\omega_x) \sin[\omega_x t + \phi(\omega_x)], \text{ where} \qquad (8)$$

$$A(\omega_x) = \frac{2\Omega_z \delta_x \omega_x}{\sqrt{(\omega_y^2 - \omega_x^2)^2 + (\omega_x \omega_y / Q_y)^2}} \xrightarrow{\omega_y \neq \omega_x} \frac{\Omega_z \delta_x}{\omega_y - \omega_x}, \qquad (9)$$

$$\phi(\omega_x) = a\tan\left(\frac{\omega_x \omega_y / Q_y}{\omega_y^2 - \omega_x^2}\right), \text{ and} \qquad (10)$$

$$\omega_y = \sqrt{k_y/m}. \qquad (11)$$

$\omega_y$ is the resonant frequency along the y-axis, $Q_y$ is the resonator quality factor along the y-axis, and $k_y$ is the linear spring constant along the y-axis. The Coriolis reaction along the y-axis has amplitude and phase given by eqs. (9) and (10) with a time variation the same as the driven x-motion, $\omega_x$. With the time variation of rate-induced ($\Omega_z$) Coriolis reaction equal to driven x-motion, the y-Coriolis motion can be distinguished from spurious motions, such as due to linear acceleration, using demodulation techniques analogous to AM radio or a lock-in amplifier. In this fashion, the electronic controls typically contained in an Application Specific Integrated Circuit (ASIC) sense and process dynamic signals to produce a filtered electronic output proportional to angular rate.

For a practical rate-sensing device, providing immunity to spurious accelerations beyond that of the aforementioned demodulation technique is crucial. A necessary embellishment of the rate sensing described in the previous paragraph is then the employment of a second driven mass oscillating along the same linear x-axis, but π radians out of phase with the first. The second mass then reacts likewise to Coriolis force along the y-axis, but necessarily π radians out of phase with the first mass. The y-motions of the two masses can then be sensed in a configuration whereby simultaneous deflection of both masses in the same direction cancel as a common mode, such as due to acceleration, but the opposing Coriolis deflections add differentially. The two masses having driven x-oscillation π radians out of phase is referred to as "anti-phase" or "antisymmetrical" operation, and the rate sensor classification is commonly referred to as a "tuning fork".

Anti-phase motion must be performed with sufficient phase accuracy. It can be accomplished by various techniques, most of which increase system complexity or fabrication processing. These include mechanical balancing by way of material ablation, electrostatic frequency tuning by way of sensor electrodes and electronic feedback, using separate and tunable drive signal phases, and using combinations of the above.

MEMS rate sensors in the prior art have numerous technical challenges related to complex system control, minute sense signals, thermal variation, and ever-present error signals. Therefore, there is a need in the art for a product that is amenable to high-volume low-cost manufacturing with minimal tuning and testing of individual sensors.

SUMMARY OF THE INVENTION

The invention is a planar oscillatory rate sensor with unique structural linkage configurations that result in fundamental "tuning fork" anti-phase type motion with negligible phase error. The presence of fundamental anti-phase motion relaxes burdens on system control of frequencies and phases, fabrication tolerances, and mechanical tuning of individual sensors. When the two linked masses are vibrated along an in-plane x-axis, and the substrate is rotated about an out-of-plane z-axis, the masses react due to the Coriolis force and oscillate in plane along the y-axis. The y-reaction is likewise anti-phase and differential sensing and demodulation results in extraction of a rate-of-rotation signal from the y-motion, wherein acceleration signals are eliminated as common-mode.

The rate sensor of this invention includes a gross mass suspended by a plurality of symmetric anchor points. Anchor points between two proof masses connect to stiff beams by flexures. The beams are subsequently interconnected in a symmetric fashion by flexures and intervening stiff beams. Ultimately, this "interior" structure connects to outer proof masses by symmetric flexures. The proof masses are preferably further supported by perimeter flexures. When one of the proof masses is forced along an axis of symmetry, the plurality of linkages and flexures in between deflect so as to force the second proof mass to move along the symmetry axis in an opposite linear direction. The plurality of stiff beams and linkages tightly constrain the proof mass motions, producing minimal resistance to anti-phase oscillations and stiff resistance to other motions, as evidenced by anti-phase being a fundamental vibration mode and other modes being higher order with comfortable mode separation.

In one embodiment, two sets of symmetric anchor points between proof masses are implemented. Additional sets of symmetric anchor points could be optionally implemented to increase resistance to spurious acceleration, but at the cost of increased mass to drive.

Each proof mass preferably includes a frame with an interior mass suspended by flexures. The frame preferably has stiff connections to the interior linkages connecting it to the opposite proof mass, preventing the frame from reacting to Coriolis force. However, the frame's interior mass and suspension can be separately tuned to have a resonant frequency such that it reacts to a desired extent to Coriolis force.

Actuation of the proof masses is preferably accomplished in a MEMS device by capacitive comb drives. Sensing of the driven motion and the Coriolis rate motion is preferably accomplished by similar capacitive techniques. An electronic ASIC provides necessary drive, sense, and signal processing functions to provide an output voltage proportional to rate. Alternatively, the use of piezoelectric or magnetic actuating elements is within the spirit of the present invention.

DETAILED DESCRIPTION OF THE INVENTION

The rate sensor of the present invention satisfies critical gyrodynamic aspects by virtue of the sensor's mechanical linkages which give rise to fundamental anti-phase motion of its two oscillating masses. This is in contrast to the dynamics of prior art coupled oscillators, which have "symmetric" and "antisymmetric" resonant modes with the undesired symmetric mode being fundamental.

In the present invention, anti-phase operation is accomplished by unique structural linkage configurations resulting in negligible phase error. The linkage dictates mechanical dynamics, which can have anti-phase motion as the fundamental mode, with insensitivity to small mass or spring imbalances. The structural symmetries produce linear motions in a robust fashion. Other oscillation modes can be of higher order with comfortable mode separation. The mechanical design is preferably realized using any of a variety of MEMS fabrication technologies, including, but not limited to, Deep Reactive Ion Etching (DRIE), surface micromachining, and bulk micromachining. The device is also preferably manufactured on any of a variety of media, including, but not limited to, a single-crystal silicon wafer, a silicon on insulator (SOI) wafer, a polysilicon wafer, an epitaxial wafer, or larger-scale conventional mechanical apparatuses.

Figure 1:
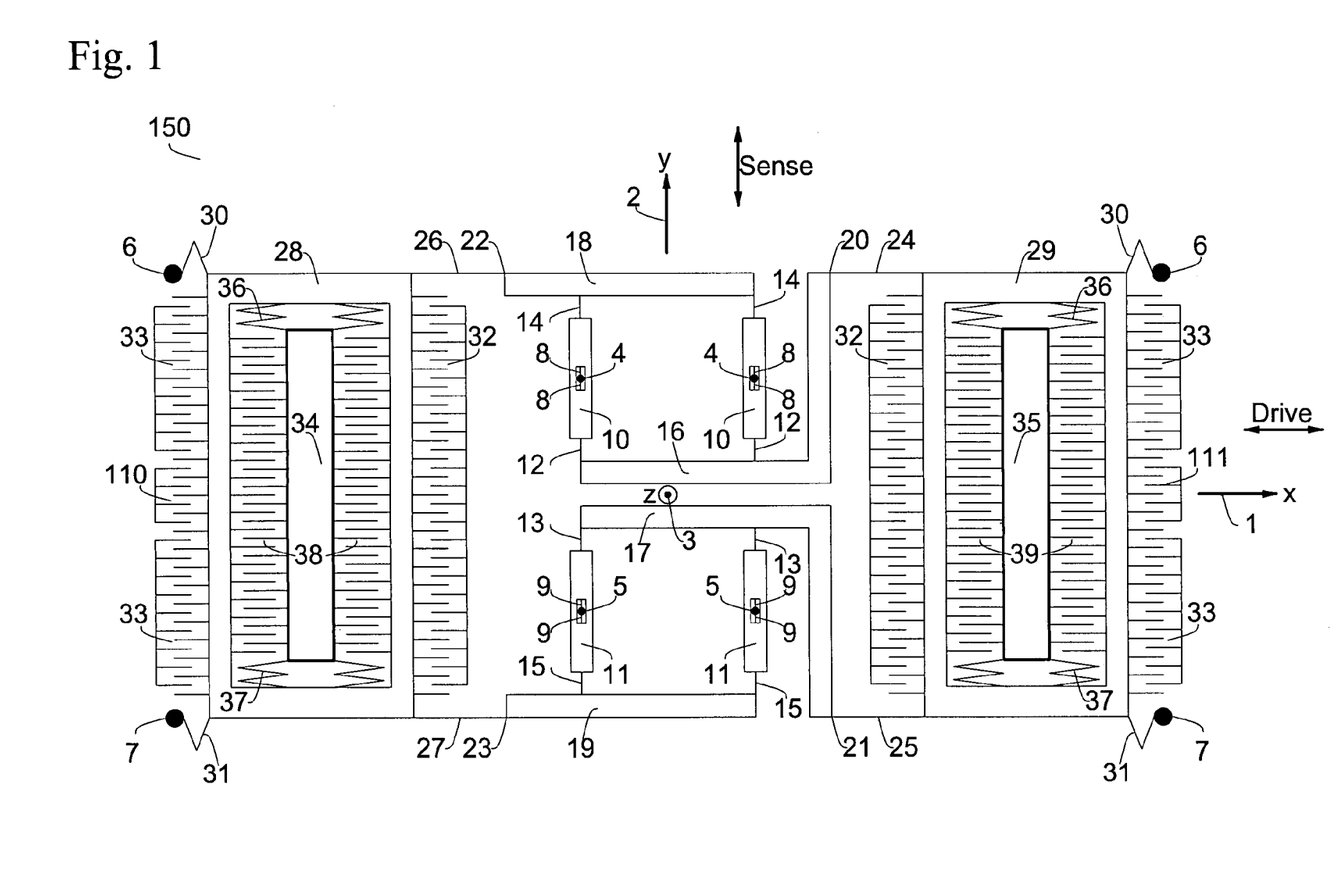
FIG. 1 shows a schematic of one embodiment of the angular rate sensor of the present invention.

Referring to FIG. 1, the rate sensor (150) has an axis of symmetry along the x-axis (1) of the device, which is also the axis of driven anti-phase motion. The released structure has anchor points to the substrate, the first set (4) and (5) being generally interior to the structure and the second set (6) and (7) generally exterior to the structure. Interconnections of flexures and stiff beams between substrate anchor points dictate the fundamental anti-phase motion of the structure.

Flexures (8) and (9) allow stiff beams (10) and (11) to pivot about anchor points (4) and (5). Flexures (12) and (14) connect stiff beams (10) to stiff beams (16) and (18), transferring pivoting motion of beams (10) to motion of beams (16) and (18) wherein beams (16) and (18) maintain their x-direction orientation. The motion of stiff beams (10), (16), and (18) then describes a rhombus constrained to collapse relative to anchor points (4), accomplished by interconnecting flexures (8), (12), and (14) resisting y-axis (2) compression, but complying to x-axis (1) bending. Symmetrically, flexures (13) and (15) connect stiff beams (11) to stiff beams (17) and (19), likewise constraining motion of the rhombus formed by stiff beams (11), (17), and (19) to collapse relative to anchor points (5). Stiff beams (10) and (11) are preferably rotating stiff beams, while stiff beams (16), (17), (18), and (19) are preferably non-rotating stiff beams. Although the four flexures (8) and (9) form a rectangle in the plane of the sensor, an intentionally slight misalignment of the flexures does not deviate from the spirit of the invention and only slightly affect sensor performance.

When the two rhombuses (10), (16), (18) and (11), (17), (19) collapse in an opposite sense about the z-axis (3), points (20) and (21) translate in the same direction along the x-axis (1), but in symmetrically opposite directions along the y-axis (2). Flexures (24) and (25) connecting beams (16) and (17) to frame (29) then resist compression and force frame (29) to translate along the x-axis (1) along with bending of flexures (30) and (31) connected to anchor points (6). Flexures (24) and (25) further compliantly bend in symmetrically opposite directions along the y-axis (2) due to motion of points (20) and (21), with the symmetrically opposite flexing not imparting a net y-axis (2) motion to frame (29). Frame (29) then describes linear motion uniquely along the x-axis (1).

Likewise, when the two rhombuses (10), (16), (18) and (11), (17), (19) collapse in an opposite sense about the z-axis (3), points (22) and (23) translate in the same direction along the x-axis (1), but in symmetrically opposite directions along the y-axis (2). Flexures (26) and (27) connecting beams (18) and (19) to frame (28) then resist compression and force frame (28) to translate along the x-axis (1) along with bending of flexures (30) and (31) connected to anchor points (6). Flexures (26) and (27) further compliantly bend in symmetrically opposite directions along the y-axis (2) due to motion of points (22) and (23), with the symmetrically opposite flexing not imparting net y-axis (2) motion to frame (28). Frame (28) then describes linear motion uniquely along the x-axis (1).

When the two rhombuses (10), (16), (18) and (11), (17), (19) collapse in an opposite sense about the z-axis (3), resulting in linear translation of frames (28) and (29) along the x-axis (1), frames (28) and (29) move in exact opposite direction along the x-axis (1), thus establishing fundamentally constrained anti-phase motion along the x-axis (1). Anti-phase motion of frames (28) and (29) can be electrostatically driven by capacitive comb drives (32) and (33), where drive banks (32) pull frames (28) and (29) toward each other and drive banks (33) pull frames (28) and (29) away from each other. A first set of sense electrodes (110) and (111) capacitively senses this driven motion of frames (28) and (29) for use in electronic monitoring of driven motion amplitude. Voltage is alternately applied to banks (32) and (33) at the mechanical resonance frequency. A square wave is applied to each, with the square waves preferably π radians out of phase.

Within frames (28) and (29), proof masses (34) and (35) are suspended by flexures (36) and (37), depicted as folded springs in FIG. 1. The flexures resist compression along the x-axis (1) but compliantly bend along the y-axis (2). Proof masses (34) and (35) then perform anti-phase motion along the x-axis (1) along with frames (28) and (29). Upon rotating the entire device about the z-axis (3), the Coriolis force acts along the y-axis (2) upon proof masses (34) and (35), but in opposite directions for each due to their anti-phase motion along the x-axis (1), as described by eqs. (3) and (8) above where there is a π radians phase difference between sine terms for proof masses (34) and (35). Frames (28) and (29) will likewise experience anti-phase Coriolis force along the y-axis (2), but spring constants of flexures (24), (25), (26), and (27) can be tuned to be much stiffer than that of flexures (36) and (37), resulting in small y-axis motion of frames (28) and (29) as compared to proof masses (34) and (35).

The Coriolis-induced anti-phase motion along the y-axis of proof masses (34) and (35) can be sensed electrostatically by a second set of sense capacitive combs (38) and (39). Capacitive comb banks (38) and (39) are electrically wired such that motion of proof masses (34) and (35) along the y-axis (2) in the same phase is sensed as a common-mode between comb banks (38) and (39), but motion of proof masses (34) and (35) along the y-axis (2) in anti-phase is sensed differentially between comb banks (38) and (39) and converted to a rate signal by an ASIC. Small y-axis (2) motion of frames (28) and (29) in reaction to Coriolis forces reduces sensed motion of proof masses (34) and (35), since the proof mass motion is sensed relative to the frame motion. Such Coriolis-induced y-axis (2) motion of frames (28) and (29) will typically be negligible compared to proof mass (34) and (35) Coriolis-induced motion.

Figure 2A:
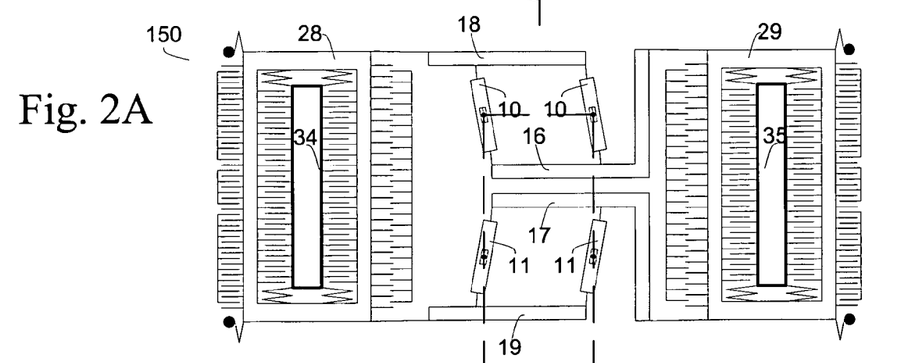
FIG. 2A shows a first phase of motion of the angular rate sensor of the present invention, where the proof masses translate along the x-axis away from the center.
Figure 2B:
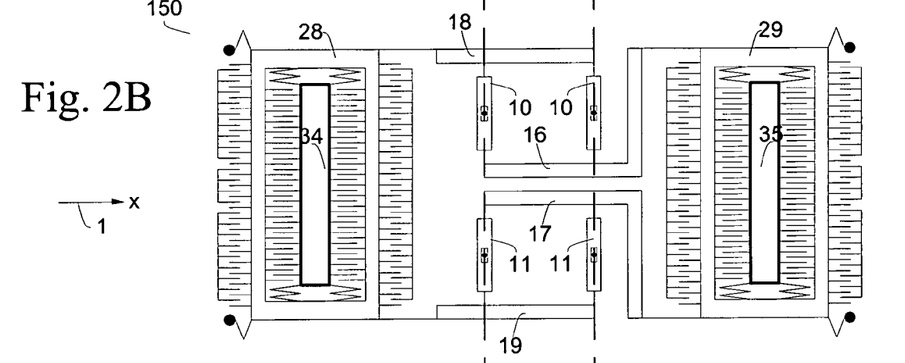
FIG. 2B shows a second phase of motion of the angular rate sensor of the present invention, where the sensor is in an unflexed state.
Figure 2C:
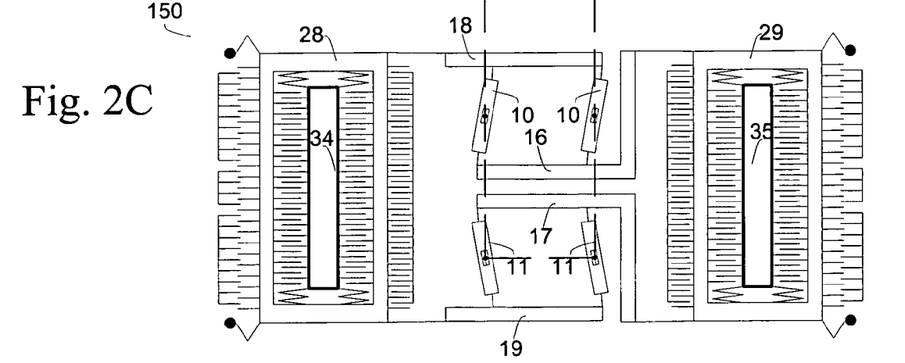
FIG. 2C shows a third phase of motion of the angular rate sensor of the present invention, where the proof masses translate along the x-axis towards the center.

FIGS. 2A through 2C illustrate the above-described driven anti-phase motion of the sensor linkages and proof masses as a series of three phases within a continuous oscillation cycle. In FIG. 2A the rhombus formed by (10), (16), and (18) collapses counter-clockwise and the rhombus formed by (11), (17), and (19) collapses clockwise, resulting in proof masses (34) and (35) translating along the x-axis (1) away from the center. FIG. 2B illustrates the device in an unflexed state. In FIG. 2C, the rhombus formed by (10), (16), and (18) collapses clockwise and the rhombus formed by (11), (17), and (19) collapses counter-clockwise, resulting in proof masses (34) and (35) translating along the x-axis (1) toward the center.

Figure 3A:
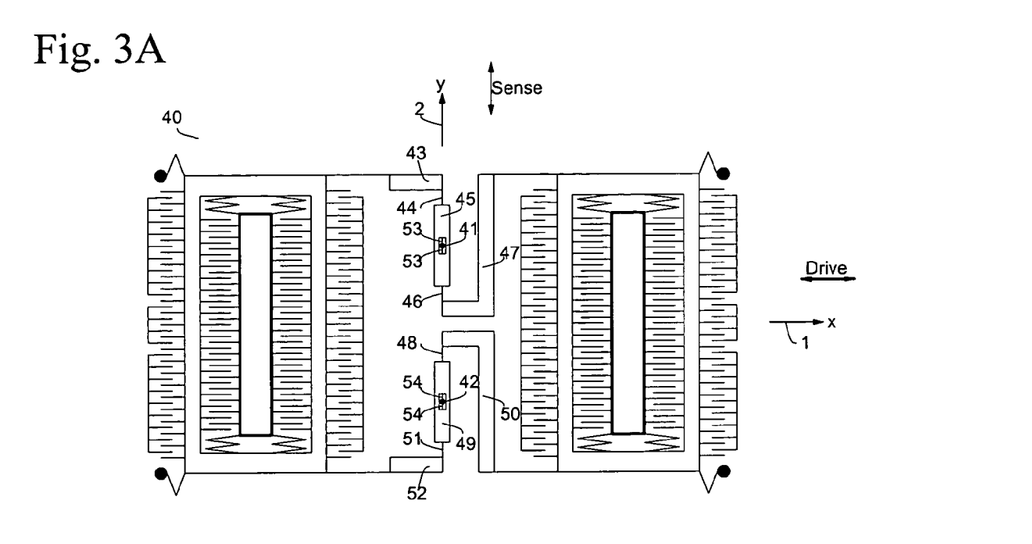
FIG. 3A shows an alternative embodiment of the present invention, where only one pair of substrate anchors is implemented in the interior region of the sensor.
Figure 3B:
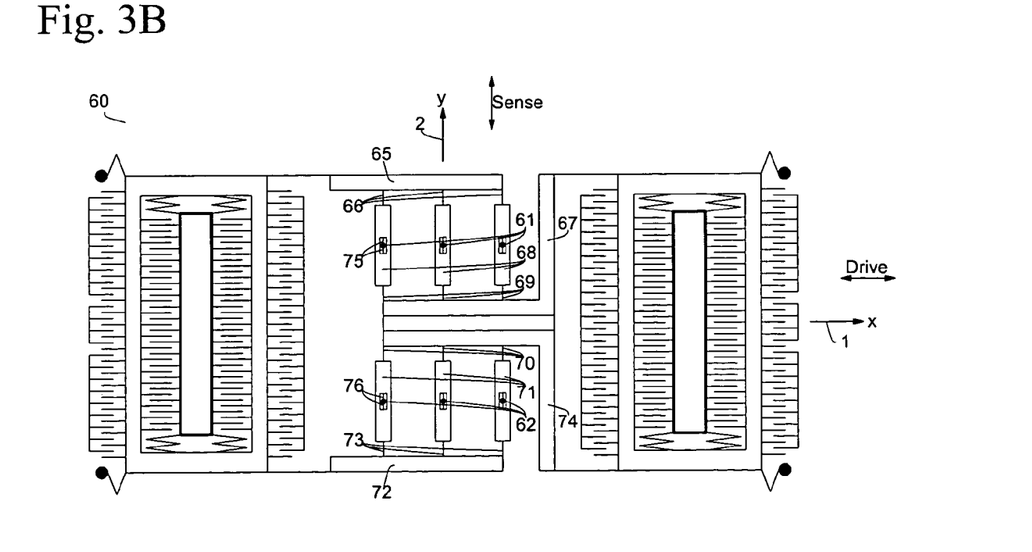
FIG. 3B shows an alternative embodiment of the present invention, where three pairs of substrate anchors are implemented in the interior region of the sensor.

FIGS. 3A and 3B show alternate embodiments of the present invention. The elements of FIGS. 3A and 3B that are not labeled are the same as the elements discussed and labeled in FIG. 1. In FIG. 3A only one substrate anchor is implemented both above (41) and below (42) the x-axis (1) of symmetry in the interior region of the sensor (40). Flexures (53) and (54) allow stiff beams (45) and (49) to pivot about anchor points (41) and (42), respectively. Stiff beam (45) is connected to stiff beam (43) by a flexure (44), and connected to stiff beam (47) by a flexure (46). Stiff beam (49) is connected to stiff beam (50) by flexure (48) and stiff beam (49) is connected to stiff beam (52) by flexure (51). In this embodiment, there is less rigidity and stability than with two or more interior anchors both above and below the x-axis (1) of symmetry. However, this arrangement requires less mass to drive and occupies less area per wafer die.

Anti-phase motion of the embodiment of FIG. 3A is accomplished in like manner to the embodiments of FIGS. 1 and 2. Comb drives (32) and (33) alternately pull frames (28) and (29) and proof masses (34) and (35), and the interior linkages (41)–(54) constrain oscillations to be inherently anti-phase along the x-axis (1) of symmetry.

In FIG. 3B, three substrate anchors are implemented both above (61) and below (62) the x-axis (1) of symmetry in the interior region of the sensor (60). Flexures (75) and (76) allow stiff beams (68) and (71) to pivot about anchor points (61) and (62), respectively. The stiff beams (68) are connected to stiff beam (65) by flexures (66) and the stiff beams (68) are connected to stiff beam (67) by flexures (69). The stiff beams (71) are connected to stiff beam (74) by flexures (70) and to stiff beam (72) by flexures (73). In this embodiment, there is more rigidity and stability than with two or fewer interior anchors both above and below the x-axis (1) of symmetry. However, this arrangement requires more mass to drive and occupies more area per wafer die. Such addition of interior substrate anchors can be extended to any number both above and below the x-axis (1) of symmetry, but additional gains in stability quickly diminish at the expense of a linear increase in more mass to drive and more area per wafer die.

Anti-phase motion of the embodiment of FIG. 3B is then accomplished in like manner to the embodiment of FIGS. 1 and 2. Comb drives (32) and (33) alternately pull frames (28) and (29) and proof masses (34) and (35), and the interior linkages (61), (62), and (65)–(76) constrain oscillations to be inherently anti-phase along the x-axis (1) of symmetry.

The rate sensor of the present invention can be manufactured by any of a number of fabrication methods known in the art. One preferred fabrication sequence for the angular rate sensor of the present invention utilizes a silicon micromechanical fabrication process described in U.S. Pat. Nos. 6,239,473 (Adams et al.) and 6,342,430 (Adams et al.), assigned to an assignee of the present invention, and incorporated herein by reference. The process results in a rate sensor composed of a trusswork of tall, thin silicon beams with integral electrical isolation segments, which serve to mechanically connect but electrically isolate separate parts of the rate sensor.

Figure 4A:
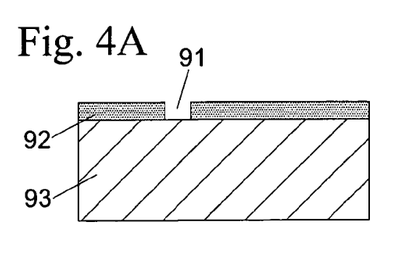
FIG. 4A shows the first step of a preferred fabrication sequence for the present invention.
Figure 4B:
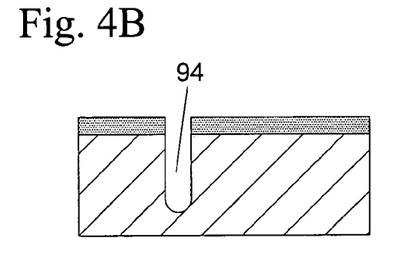
FIG. 4B shows the second step of a preferred fabrication sequence for the present invention.
Figure 4C:
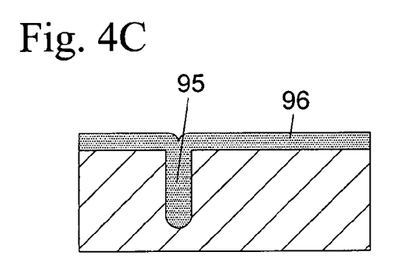
FIG. 4C shows the third step of a preferred fabrication sequence for the present invention.
Figure 4D:
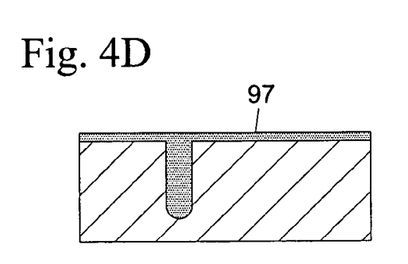
FIG. 4D shows the fourth step of a preferred fabrication sequence for the present invention.
Figure 4E:
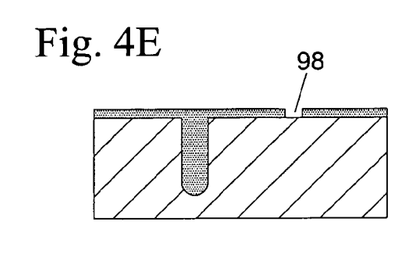
FIG. 4E shows the fifth step of a preferred fabrication sequence for the present invention.
Figure 4F:
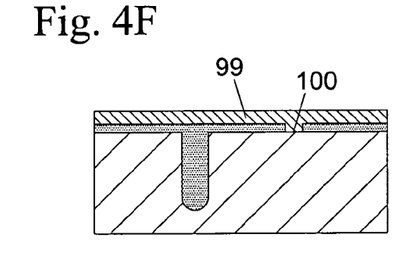
FIG. 4F shows the sixth step of a preferred fabrication sequence for the present invention.
Figure 4G:
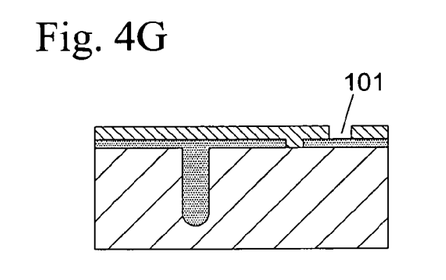
FIG. 4G shows the seventh step of a preferred fabrication sequence for the present invention.
Figure 4H:
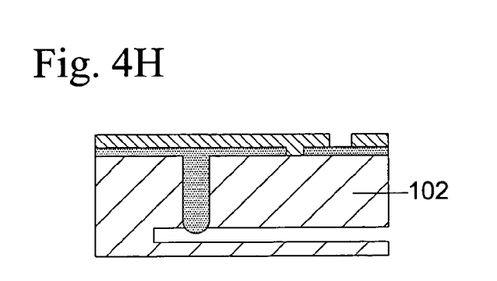
FIG. 4H shows the eighth step of a preferred fabrication sequence for the present invention.

This fabrication process is detailed in U.S. Pat. No. 6,239,473 and depicted in FIGS. 4A through 4H. In the first step, shown in FIG. 4A, the fabrication process begins with a substrate, or wafer (93), which is preferably made of silicon, with a dielectric layer (92) patterned with conventional techniques (91). In step 2 (FIG. 4B), the wafer (93) is etched to produce an isolation trench (94). In step 3 (FIG. 4C), the trench is filled (95) with a dielectric layer (96). In step 4 (FIG. 4D), the dielectric layer (96) and filled trench (95) are planarized to provide a smooth dielectric surface (97) with an integral electrically isolating dielectric segment. In step 5 (FIG. 4E), a via (98) in the dielectric (97) is patterned and etched to expose the surface of the silicon (93) for electrical connection. In step 6 (FIG. 4F), a metal layer (99) is deposited on the dielectric layer (97) and makes contact through the via (98) at the silicon surface (100). In step 7 (FIG. 4G), the metal (99), preferably aluminum, is patterned (101) to create different electrode routing configurations. In step 8 (FIG. 4H), the beams (102), preferably made of silicon, are patterned, etched, passivated, and released to provide free standing cantilevers for micromechanical elements. All of the MEMS structure is preferably made of the same building-block beams, which are trussed together in different configurations to make, for example, the stiff beams and/or the flexures.

The process offers several distinct advantages that permit the rate sensor to function and operate at high performance levels. The high aspect, single crystal silicon beams allow the rate sensor to be built as a trusswork over millimeter-scale diameters, large by conventional micromachining standards. Various linkage configurations of the trusswork can be implemented to yield stiff larger-scale beams or thin flexures. This permits the rate sensor to obtain large inertial mass, resulting in high sensitivity and high resolution. A metal conductive layer is present on the top of the beam structures only, providing multiple structural connections such as are required for comb drive and sense. Isolation segments are incorporated into the silicon beams, reducing parasitic capacitance and electrically decoupling the different functions of the rate sensor. In regions where capacitive comb actuation or sensing is required, the metal layer contacts the beam silicon cores, which serve as the capacitor plates. This is allowed because the isolation segments interrupt the conduction path from the silicon beams to the substrate silicon. Finally, in areas which require electrical paths to cross each other in order to address different active sections of the rate sensor, a multi-level conduction path is possible using the top conductive metal layers and the contacts to the underlying silicon. The process thus allows each of the functionalities required in the rate sensor and performs them in a highly manufacturable environment with standard silicon substrates.

Figure 5:
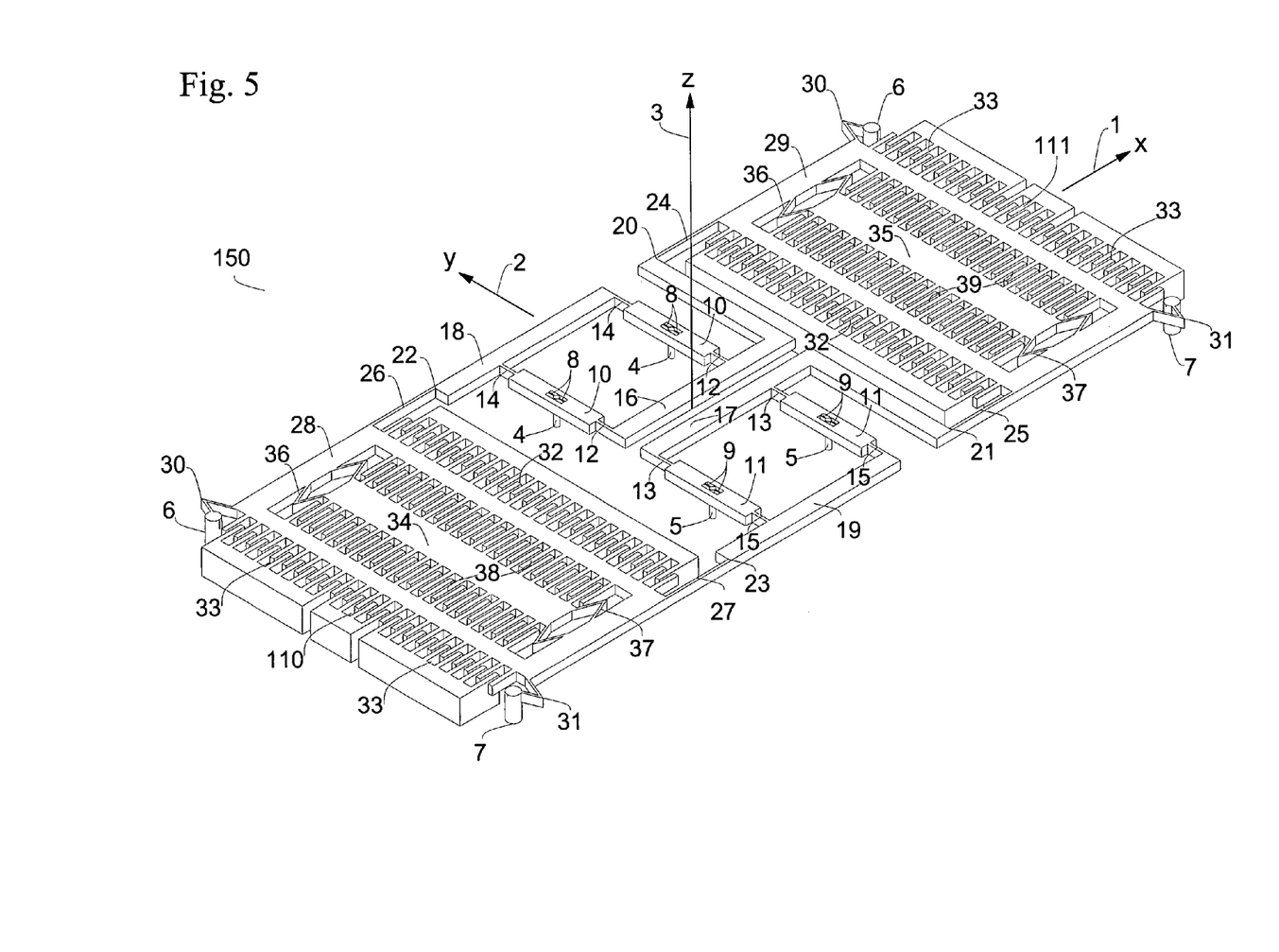
FIG. 5 shows an isometric view of an embodiment of the present invention.

FIG. 5 shows an isometric view of the rate sensor (150) in FIG. 1, illustrating how a released silicon MEMS device may appear with finite beam and flexure widths and heights. Specific aspect ratios of widths and heights vary depending upon fabrication technology and mode tuning. As an example, if a device of this invention were fabricated to have a frequency separation as defined in eqs. (5) and (11) of $\omega_y-\omega_x=2\pi*500$ Hz (non x-y resonant operation) and a driven amplitude along the x-axis as defined in eq. (4) of $\delta_x=10$ µm, the Coriolis displacement along the y-axis as defined in eq. (9) for an input rotation rate of $\omega_z=100°/s$ would be 5.4 nm for the proof masses.

Figure 6:
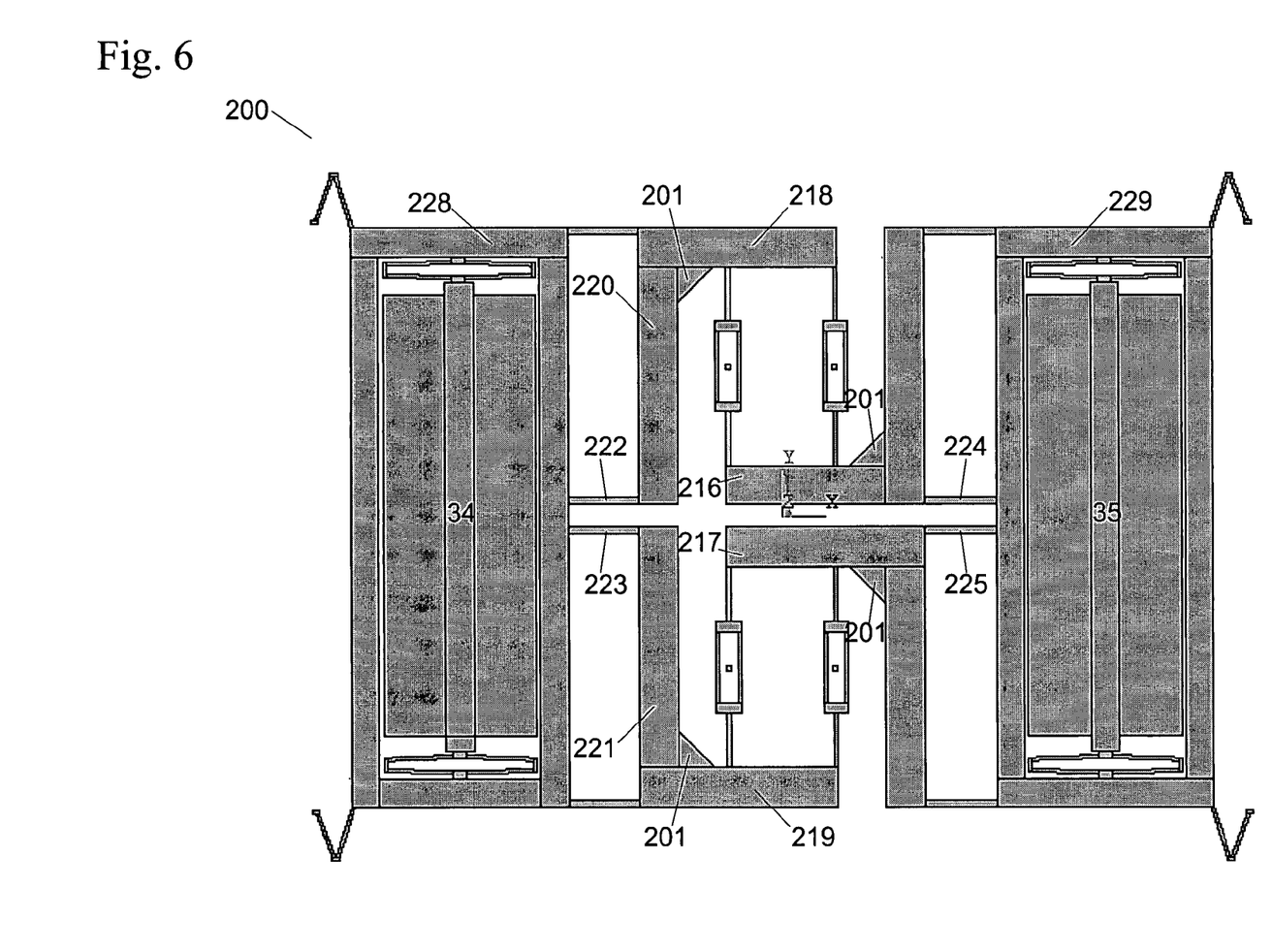
FIG. 6 shows a schematic of a preferred embodiment of the present invention with additional support beams and gusseting to increase desired stiffness of elements.

FIG. 6 shows an embodiment of the present invention with increased stability, where the rate sensor (200) has stiff beams (216), (217), (218) and (219) further linked by stiff beams (220) and (221), flexures (222), (223), (224), and (225), and gussets (201) to reduce undesired dynamic bending of beams (216) and (217) and frames (228) and (229) during oscillation.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A sensor, having orthogonal x-, y-, and z-axes, for detecting a rate of rotation about the z-axis comprising:
    a substrate; and
    a gross mass, symmetrical with respect to the x-axis, suspended from the substrate by a plurality of interior and exterior anchor points, and comprising:
        at least two proof masses, symmetrical with respect to the x-axis and the y-axis;

a driven frame surrounding each proof mass and attached to its proof mass and external anchor points by flexures;

a set of drive banks and a first set of sense banks for each driven frame for oscillating along the x-axis;

a second set of sense banks attached to each proof mass for detecting Coriolis motion along the y-axis;

at least two rotating stiff beams, each centrally mounted to an interior anchor point, oriented in a y-direction at rest, and able to rotate about its anchor point in an xy-plane orthogonal to the z-axis; and a plurality of inner frame supports, asymmetric with respect to the y-axis, connecting the rotating stiff beams to the frames, and comprising a plurality of non-rotating stiff beams and a plurality of flexures, to allow frame motion predominantly along the x-axis in anti-phase motion only such that Coriolis-induced anti-phase motion of the proof masses along the y-axis results.

2. The sensor of claim 1, wherein each drive bank and each sensor bank is a capacitive comb.

3. The sensor of claim 2, wherein the capacitive combs are used to determine the relative positions of the proof masses and the relative positions are used to determine the sensed rate of rotation.

4. The sensor of claim 1, wherein the rotating stiff beams, the non-rotating stiff beams, and the flexures connecting them form at least one rhombus constrained to collapse.

5. The sensor of claim 1, wherein the rotating stiff beams comprise two pairs of rotating stiff beams with interior anchor points forming a rectangle in the xy-plane.

6. The sensor of claim 1, wherein the rotating stiff beams comprise two rotating stiff beams positioned along the same line in the y-axis.

7. The sensor of claim 1, wherein the rotating stiff beams comprise two sets of at least three rotating stiff beams, each set with anchor points along the same line in the x-axis.

8. The sensor of claim 1, wherein at least one non-rotating stiff beam includes a gusset to resist bending of the non-rotating stiff beam.

9. The sensor of claim 1, wherein the sensor is fabricated by a fabrication technique selected from the group consisting of:
  a) deep reactive ion etching;
  b) surface micromachining; and
  c) bulk micromachining.

10. The sensor of claim 1, wherein the sensor is fabricated using a material selected from the group consisting of:
  a) a single crystal silicon wafer;
  b) a silicon on insulator wafer;
  c) a polysilicon wafer; and
  d) an epitaxial wafer.

* * * * *